Dec. 28, 1943. F. G. STULLER 2,337,859
SCUM REMOVER
Filed Feb. 20, 1942. 2 Sheets-Sheet 1
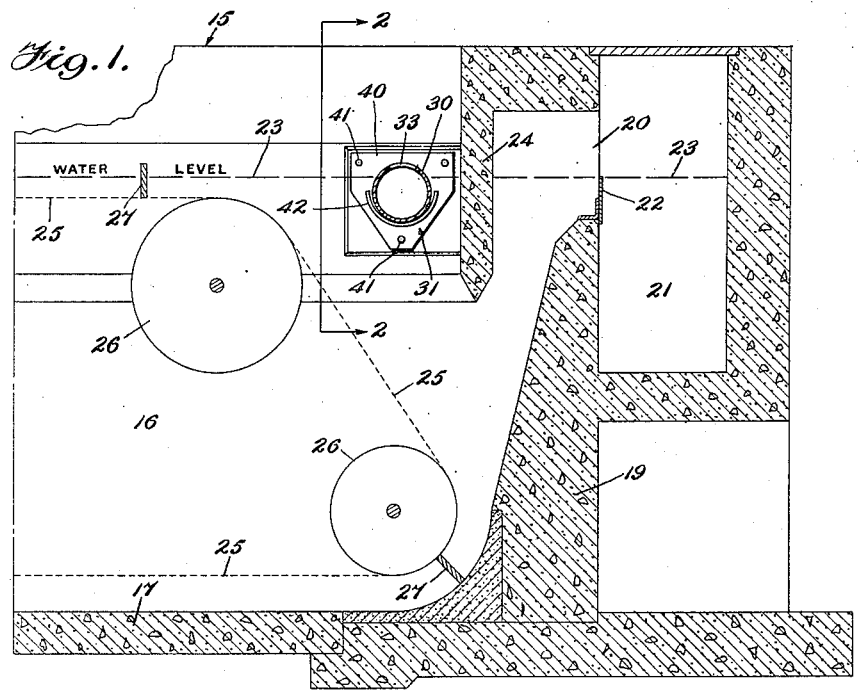
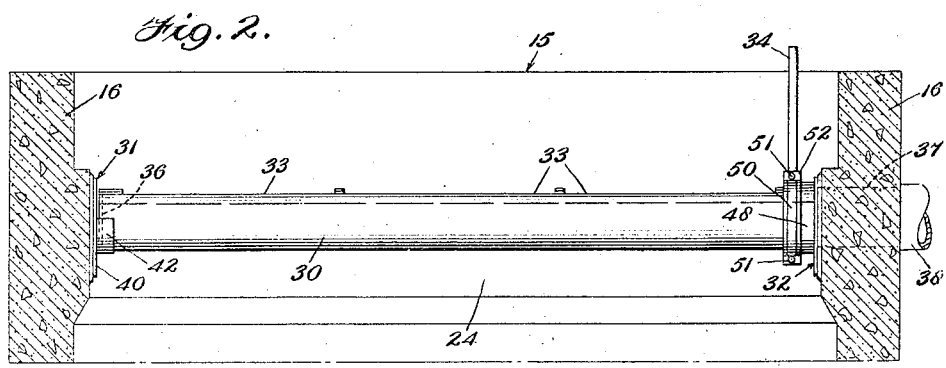
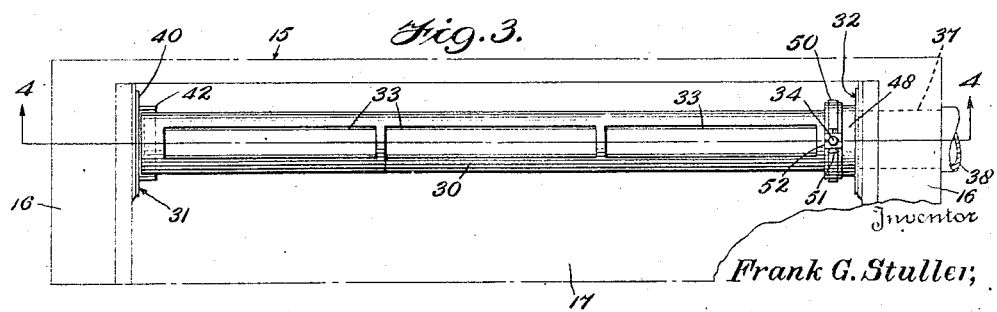
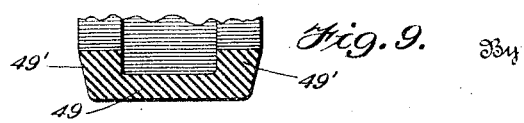
Inventor
Frank G. Stuller;

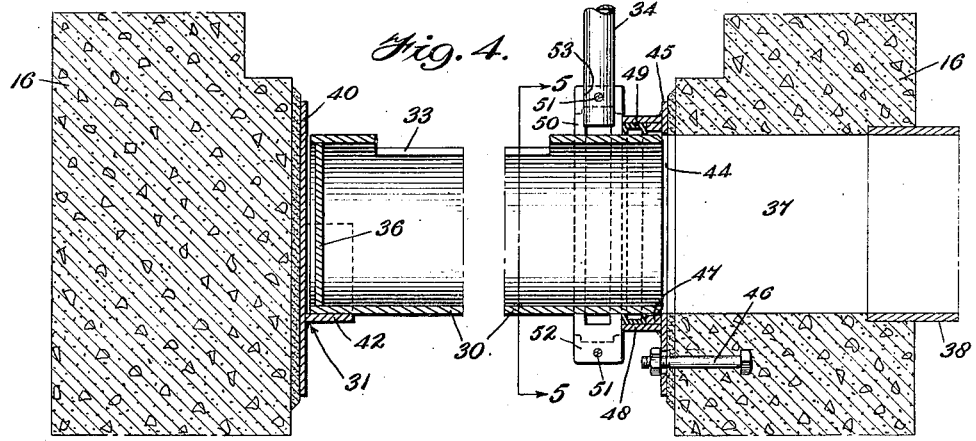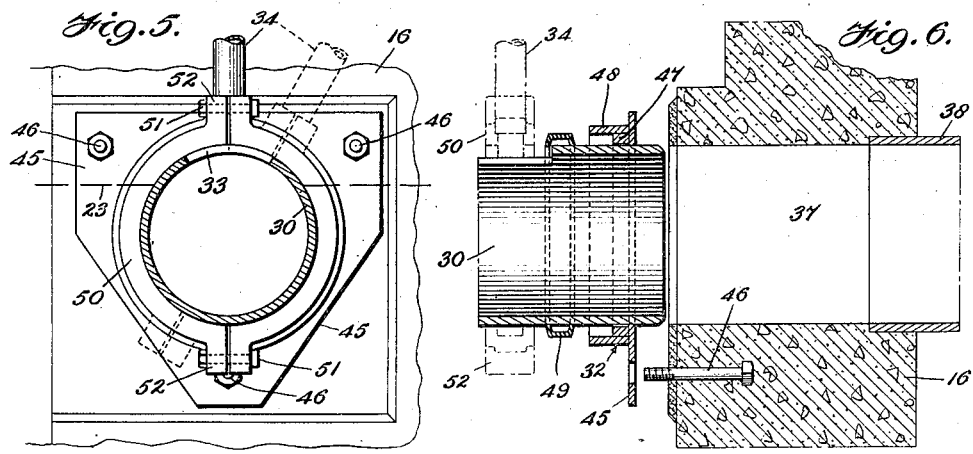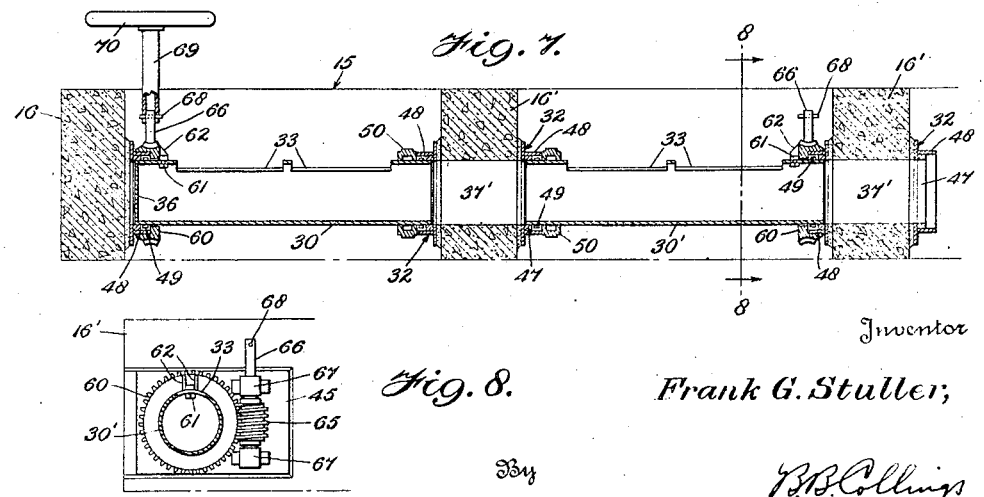

Patented Dec. 28, 1943

2,337,859

UNITED STATES PATENT OFFICE 2,337,859

SCUM REMOVER

Frank G. Stuller, Milwaukee, Wis., assignor to Chain Belt Company, Milwaukee, Wis., a corporation of Wisconsin Application February 20, 1942, Serial No. 431,759

6 Claims. (Cl. 210—3)

The invention relates to mechanism for removing scum and floating debris from controlled bodies of liquids, and for purposes of disclosure it has been illustrated in the accompanying drawings and will be herein described in connection with a sedimentation tank of a type commonly employed in sewage disposal, although it will be readily apparent to those skilled in the art that the apparatus is by no means limited to this particular field.

In sewage disposal work it is now common practice to introduce the raw sewage into settling tanks or receptacles, ordinarily in the form of elongated concrete vats, through which it flows at a relatively low rate of speed whereby the organic and inorganic solids which are suspended in the sewage liquid may settle to the floor of the tanks, from which such solids are continuously or intermittently removed by suitable sludge-removing apparatus. The liquid in the tanks may also carry froth or scum, as well as floating debris such as leaves and twigs, and since it is desirable that the effluent liquid be as clear as possible, means are usually provided for separating such lighter unsettleable materials from the liquid and discharging them from the tanks.

It is a primary object of the present invention to provide an apparatus for segregating and removing froth, scum and debris floating at or near the surface of a body of liquid within a tank such, for example, as a settling tank of the type referred to above, which mechanism will be simple in construction, comparatively inexpensive to manufacture, install and maintain, and may be easily and quickly assembled, while being quite efficient in the accomplishment of its intended purpose.

A further object of the invention is to provide a simple and effective seal or packing for the relatively loose fitting bearings of the mechanism whereby to prevent undue leakage of the liquid from the tank. Other objects will appear as the description proceeds.

In the accompanying drawings forming a part of this specification, in which like reference characters designate like parts in all the views:

Figure 1 is a longitudinal vertical sectional view of the effluent end of a typical sedimentation tank for sewage disposal work, with one form of scum removing mechanism constructed and arranged in accordance with this invention positioned therein;

Figure 2 is a partial transverse sectional elevational view, on approximately the plane indicated by the line 2—2 of Figure 1, looking in the direction of the arrows;

Figure 3 is a plan view of the parts shown in Figure 2;

Figure 4 is a transverse sectional view, on an enlarged scale and partly broken away, on approximately the plane indicated by the line 4—4 of Figure 3, looking in the direction of the arrows;

Figure 5 is a sectional elevational view at right angles to Figure 4, on the plane indicated by the line 5—5 of the latter figure, looking in the direction of the arrows;

Figure 6 is a view similar to the right hand portion of Figure 4, illustrating the mode of assembling the parts;

Figure 7 is a view similar to Figure 4 but on a reduced scale, showing a somewhat modified form of construction;

Figure 8 is a sectional elevational view at right angles to Figure 7, taken on the plane indicated by the line 8—8 of the latter figure, looking in the direction of the arrows; and Figure 9 is a fragmentary cross sectional view, on an enlarged scale, of the resilient sealing or packing ring, illustrating its condition or configuration before assembly.

In Figures 1 to 6 of the said drawings the scum removing mechanism is illustrated in a typical application to a single compartment concrete sedimentation tank 15 having side walls 16, floor 17, and an end wall 19 provided with an outlet port 20 communicating with an effluent channel or conduit 21, which port may have an adjustable weir 22 associated with it whereby the water level 23 may be controlled within suitable limits. A transverse baffle 24 usually extends across the tank in front of the port 20, and the tank may be provided with power driven sludge removing apparatus such, for example, as a well known endless conveyer type, here illustrated more or less diagrammatically, comprising transversely spaced longitudinally traveling endless chains or belts 25 trained about sprockets 26 mounted within the tank 15. The said chains have transverse flights or scrapers 27 secured to them, the primary purpose of which is to traverse the floor 17 of the tank and move the settled solids or sludge to the influent end of the tank where they are withdrawn. It is customary in this type of sludge remover to so arrange the upper run of the conveyer that the flights 27 break the surface of the liquid, as shown in Figure 1, so that in returning to the effluent end of the tank to begin a new sludge scraping traverse, they carry with them froth, scum and/or debris floating at or near the liquid surface. The scum removing mechanism of the present invention may therefore be conveniently located adjacent the baffle 24 when used in conjunction with sludge removing apparatus of the character described; but it will be readily appreciated that under other conditions the said scum remover may be located at other points within the tank.

The said scumming mechanism comprises essentially a pipe or conduit 30 mounted within the tank 15 at substantially the water level 23, spanning the space between the side walls 16 and journaled thereon, in bearings 31 and 32 to be later described in detail, for oscillatory movements about its axis. The said pipe is provided with one or more longitudinally disposed ports 33, which in the normal position of the mechanism are positioned above the water line, as indicated in Figures 1, 2 and 5, so as to prevent entry of liquid, scum and debris into the pipe through them. Should periods occur when there is no scum or floating debris on the liquid, the scummer pipe may be permitted to remain in such position throughout them, thereby preventing the escape of any liquid through it. In the normal operation of these tanks however, there is usually some scum and debris present, and in the contemplated normal use of the apparatus the pipe 30 may be permitted to remain in the inoperative position referred to until there is an accumulation of floating matter against its wall, whereupon the pipe will be manually turned about its axis, by means of a lever 34 rigidly secured to it, through an angle of say 60°, as indicated in dotted lines in Figure 5, to bring a portion of its ports 33 below the liquid level and thereby admit some of the liquid to the interior of the pipe, which liquid of course carries the scum and debris with it. The pipe may be kept in this position until the accumulation has been eliminated, and then returned to its normal position; or in the event heavy and continuous quantities of floating matter are present, the pipe may be left in its operative position until conditions change. Removal of the floating matter may thus be continuous or intermittent, as conditions dictate; and by varying the angular displacement of the pipe to bring more or less of its ports 33 beneath the liquid level, the rate of removal may be controlled.

The pipe 30 is closed at one end, as by a disk or plug 36, but is open at its other end to discharge through a passage 37 formed in the tank wall 16 to a discharge conduit 38 which conveys the material to any desired point for treatment or suitable disposal.

As above mentioned, the pipe 30 is journaled for its oscillatory movements in bearings 31 and 32 which are mounted on the side walls 16 of the tank. The bearing 31 at the closed end of the pipe comprises a base plate 40 adapted to be secured to the face of a tank wall in any appropriate manner, as by bolts 41, which plate is provided with an arcuate projecting flange or saddle 42. The said saddle may be conveniently formed from an iron bar rolled to substantially semi-circular shape and welded along one edge to the face of the plate, all as indicated in Figures 1, 2 and 3. The inner radius of the said saddle is preferably slightly greater than the radius of the outer surface of the pipe 30, so that the latter may be readily dropped into the socket formed by the saddle, occupying a position slightly eccentric relative to the saddle, as shown in Figure 1. Since the arcuate movements of the pipe are not of great amplitude, and are at a slow speed as well as relatively infrequent, accurately fitting bearings are not essential, and ones constructed as just described have been found quite satisfactory while at the same time providing ease of assembly.

The bearing 32 at the open or discharge end of the pipe 30 comprises a base plate 45 similar to the plate 40, except that it is provided with an aperture 44 of a diameter substantially equal to the outside diameter of the pipe 30. This plate 45 is securable to the face of the tank wall as by bolts 46, and to its face there is rigidly secured, as by welding, two concentric annuli 47 and 48 the former or inner of which is shorter, in an axial direction, than the other and serves as the journal for the pipe end, as clearly shown in Figure 4. These annuli may be conveniently formed in the same manner as the flange 42, i. e. by rolling bar material. The outer annulus 48 projects beyond or overhangs the inner one 47 to provide a housing for a resilient sealing or packing ring 49. A split collar 50 is clamped upon the pipe 30 abutting the end of annulus 48 and serves to retain the said packing ring 49 against displacement. The collar is clamped upon the pipe by bolts 51 which pass through pairs of companion ears 52, one pair of which is radially bored to provide a socket 53 for receiving an end of the operating lever 34, all as will be clear from Figures 4 and 5.

The construction above described materially facilitates assembly of the parts, which may be readily accomplished as follows: The saddle bearing 31 is secured in place upon the face of its tank wall 16 by the nuts and bolts 41, and the sealing ring 49 and bearing 32 are slipped upon the open-end portion of the pipe 30, before it is lowered into the tank, to approximately the positions shown in Figure 6. As indicated in the drawings, the pipe 30 is of a length slightly less than the distance between the opposed faces of the tank walls 16 upon which it is to be mounted, and with the bearing 32 positioned somewhat inwardly from the open end of the pipe the latter may be lowered in a substantially horizontal position until its closed end portion seats in the saddle 42 of the bearing 31. This brings the open end of the pipe into substantial alinement with the passage 37 in the adjacent tank wall 16, whereupon the bearing 32 may be slipped or worked axially of the pipe to its operative position against the face of said tank wall, where it is secured by nuts threaded upon the bolts 46. The sealing ring 49 is then moved axially on the pipe into the housing formed by the annulus 48, whereupon the split collar 50 may be positioned upon the pipe, the operating lever 34 introduced into its socket, and the said collar clamped by the bolts 51 with its side face abutting the end of the said housing annulus and the sealing ring 49, as in Figure 4. The collar 50 thus performs the double function of providing an operating connection between the pipe 30 and its operating lever 34, and of retaining the sealing ring 49 in operative position.

Although the packing or sealing ring 49 may be of various suitable materials as well as of various cross sectional configurations, it is preferred that it take the form of a rubber annulus, of substantially U cross section, as best shown in Figure 9, with its legs 49'—or at least the outer faces thereof—somewhat divergent before introduction into operative position within the housing annulus 48. However, when the ring is moved into the housing and the collar 50 clamped in position the said legs are compressed and straightened so that their outer faces are substantially perpendicular to the outer circumference of the ring, as shown in Figure 4. The compression and straightening of the legs 49' causes their inner circumferential faces to tightly grip the pipe 30, while the resilience of the ring of course constantly tends to spread the legs to the Figure 9 position, and as a result good sealing contact is secured and maintained between the surfaces of the ring 49 and the companion surfaces of the pipe 30, journal annulus 47, housing annulus 48 and collar 50, which effectively prevents undue leakage of liquid through the loosely fitted journal bearing.

In Figures 7 and 8 there is shown the application of a somewhat modified form of the invention to a plural compartment settling tank, i. e. one in which several adjacent parallel settling chambers are provided by intermediate walls 16'. Here a pipe 30 for one of the outside chambers may be of a construction identical with that of the pipe 30 described above, while the pipes 30' for the remaining chambers may be of a similar construction except that they are open at both ends. The intermediate tank walls 16' are provided with alined apertures or passages 37' and the walls 16 and 16' carry bearings 32 similar to the bearings 32 described above. The pipes 30 and 30' are mounted therein in axial alinement and with the passages 37' form a continuous conduit extending completely across the plural compartment tank. Each pipe however, is provided with its own operating mechanism so that it may be manipulated independently, in accordance with scum conditions in its particular chamber.

The operating means for the pipes may of course be of the hand lever type described above, but as shown in Figures 7 and 8 is of a worm and gear type, comprising a worm wheel 60 journaled upon the housing annulus 48 of one of the bearings 32 which support the pipe. The said worm wheel may be so formed as to extend across the end face of the annulus 48 and the packing ring 49, and thus take the place of the split collar 50 for retaining the packing ring in place. The worm wheels may be operatively but readily detachably connected to their pipes, as by bolts 61 extending through the pipe wall and engaging between spaced ears 62 carried by the wheels. As best shown in Fig. 7, the bores of the worm wheels 60 through which the pipes 30, 30' pass, are of slightly larger diameter than that of the pipes, thereby providing clearance between the pipes and wheels, and since the driving connections 61, 62 between the two are not rigid, a certain amount of misalinement of the pipes relative to the wheels will be accommodated. A worm 65 meshes with the wheel 60, being carried by a shaft 66 journaled in bearings 67 carried by the base plate 45 of the pipe bearing 32. The worm shaft 66 carries pins or projections 68 which are readily detachably receivable in sockets formed in the stem 69 of a removable key 70, whereby the said worm shaft may be oscillated. Ordinarily only one such key would be provided for each installation, it being applied to and removed from the several worm shafts as occasion demands.

Split collars 50 are employed with the companion bearings 32 of each pipe but of course are not provided with operating levers 34.

Having thus fully set forth two illustrative embodiments of the invention for purposes of disclosure but not of limitation, what is claimed is:

1. In scum removing apparatus for a sedimentation chamber or the like having spaced opposed walls one of which is provided with a passage, said apparatus comprising a substantially horizontal partly submerged conduit spanning the chamber between said walls, said conduit having a closed end, an open end communicating with said wall passage, and a perimetric admission port intermediate said ends; a saddle bearing for the closed end of said conduit, secured to and projecting from the face of one of said chamber walls opposite the passage in the other wall; an annular bearing structure providing a loosely fitting journal for the open end portion of said conduit, secured to and projecting from the face of the last mentioned wall in alinement with its passage: said conduit being of a length somewhat less than the distance between said walls whereby it may be lowered between them in a substantially horizontal position carrying said annular open end bearing structure for positioning and securement thereof to its wall when the closed end of the conduit has been seated in said saddle bearing and its open end alined with the wall passage; and means for rotatively moving the conduit in said bearings to at least partially submerge its admission port, whereby scum and floating debris may enter the conduit and be discharged through the wall passage.

2. In scum removing apparatus for a sedimentation chamber or the like having spaced opposed walls one of which is provided with a passage, said apparatus comprising a substantially horizontally disposed partly submerged conduit spanning the chamber between said opposed walls and having an open end communicating with said wall passage, said conduit also having an admission port in that portion of its perimetric wall which is normally above the liquid level; bearing structures providing loosely fitting journals for said conduit; secured to said opposed chamber walls and projecting from the faces thereof, the bearing structure journaling the open end portion of the conduit having a packing receiving housing open to the chamber; a packing in said housing for preventing leakage from the chamber to the conduit and wall passage; a split collar provided with a socket, clamped upon the conduit abutting said housing to retain said packing in place therein; and an operating lever secured in said collar socket, whereby the conduit may be rotatively moved in the bearing structures to at least partially submerge its admission port to permit entry of the scum and floating debris to the conduit and its discharge through the wall passage.

3. In scum removing apparatus for a sedimentation chamber or the like having spaced opposed walls one of which is provided with a passage, said apparatus comprising a substantially horizontal partly submerged conduit spanning the chamber between said walls and having an open end communicating with said wall passage, said conduit also having an admission port in that portion of its perimetric wall which is normally above the liquid level; bearing structures providing loosely fitting journals for said conduit, secured to and projecting from the opposite faces of the respective walls, at least one of said bearing structures having an annular packing-receiving recess open at one end to the chamber; a resilient packing ring in said recess of substantially U cross section, the annular end faces of said ring in its normal unstressed condition being outwardly convergent, said packing ring being positioned in its recess under pressure to bring said convergent end faces into substantial parallelism whereby the ring material is stressed and a sealing contact is secured between the ring, conduit and bearing structure which prevents leakage of liquid from the chamber to the conduit through the loosely fitting journal; means for retaining said packing ring in said recess in such stressed condition; and means for rotatively moving the conduit in its journals to partially submerge its admission port.

4. In scum removing apparatus for a sedimentation chamber or the like, comprising a partly submerged conduit spanning the chamber between opposed walls thereof, said conduit having an open end and an admission port in that portion of its perimetric wall which is normally above the surface of the liquid; a loosely fitting bearing carried by a wall of the chamber journalling the open end portion of the conduit, the bearing structure also including a housing for a packing material; a packing ring surrounding the conduit and positioned within said housing, for preventing leakage of liquid from the chamber to the conduit through said bearing; a worm wheel connected to the conduit and having a portion engaging said packing ring to retain it within the housing; and a worm operatively engaging said wheel whereby the conduit may be oscillated to at least partially submerge its port to admit liquid, scum and debris to the conduit therethrough.

5. Apparatus according to claim 4, wherein the connection between the worm wheel and conduit accommodates slight misalinement between the two.

6. Apparatus according to claim 4, wherein the worm wheel is journaled on the bearing structure, and the connection between said wheel and conduit comprises engaging elements carried by each which accommodate slight misalinement betweeen the two.

FRANK G. STULLER.